3,483,689
FOLDING RAKE
Harold Arthur Kabel, 1611 Circular Road,
Toledo, Ohio 43614
Filed Apr. 13, 1967, Ser. No. 630,604
Int. Cl. A01d 7/00, 1/00
U.S. Cl. 56—400.19                                                                 4 Claims

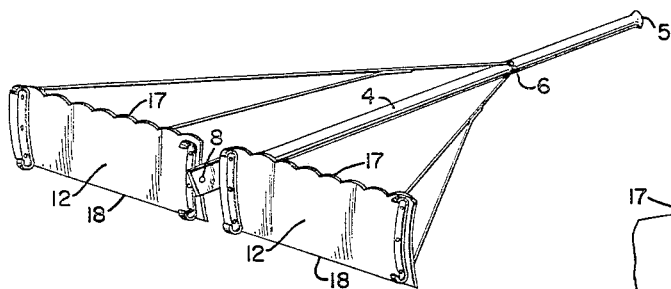
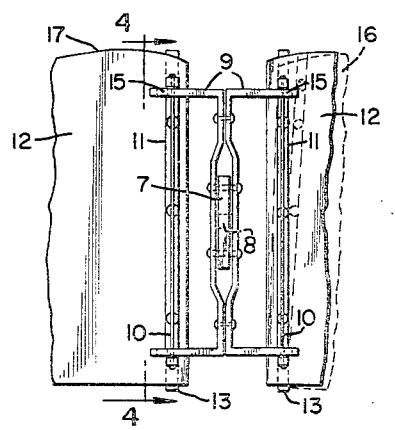
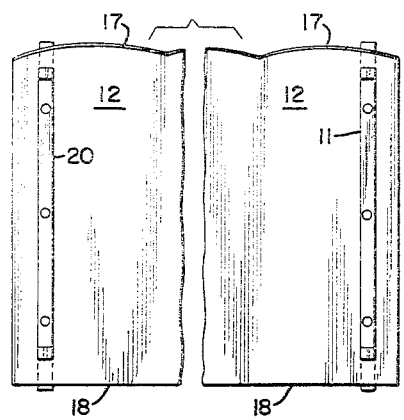
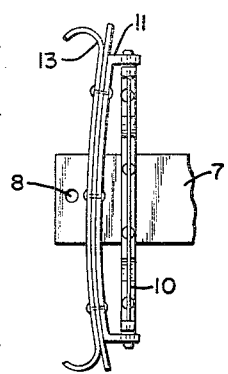
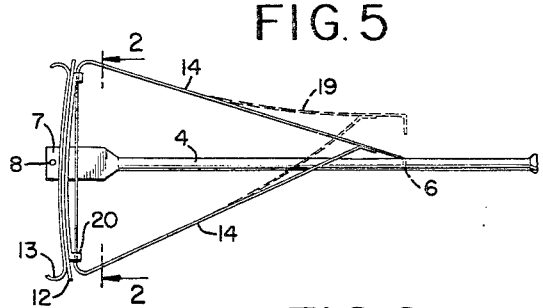
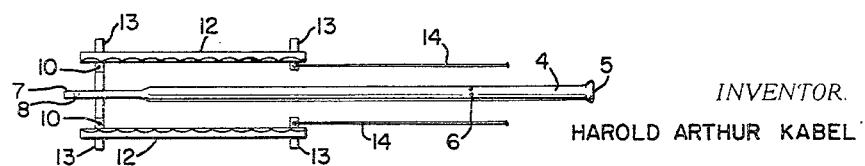
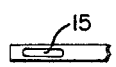
INVENTOR.
HAROLD ARTHUR KABEL United States Patent Office 3,483,689
Patented Dec. 16, 1969

ABSTRACT OF THE DISCLOSURE

This invention relates to a folding lawn rake which includes two rake members pivotally mounted on a handle. The rake members are adjustable from a fully extended working position to a closed storage position adjacent the handle by means of manually operative control wires connected between braces on the rake members and the handle.

---

This invention relates to a device for an easy way of raking lawns of tree leaves which have gathered in large quantities. Heretofore, rakes have been constructed in simple form but when used result in a long and tedious job in cleaning lawns. The present invention is directed to an improved rake which obviates disadvantages of prior construction heretofore marketed.

A primary object of the invention is to provide a rake of large dimensions, to do a big job, yet be easy to handle, inexpensive to manufacture and have little or nominal maintenance expense.

It is to be understood that my invention can be manufactured in a variety of forms.

The invention is fully disclosed in the following specification, of which the accompanying drawings form a part, in which the separate parts of my improvement are designated by suitable reference characters in each of the views, and in which:

FIGURE 1 is a perspective view of the rake in open position showing my improved design of the rake.

FIGURE 2 is an elevational view of the several affixed braces and form of assembly as along a line 2—2 of FIGURE 5.

FIGURE 3 is an elevational blown view of front of blade.

FIGURE 4 is a sectional view taken substantially along line 4—4 of FIGURE 2.

FIGURE 5 is a left side elevation of rake showing wires used in holding rake in open position, and broken lines showing wires out of holes which allow rake to be folded.

FIGURE 6 is a top plan view of rake in folded position.

FIGURE 7 is a top plan view of bracket extensions 9 showing elongated holes.

For the purpose of illustrating one use of my invention and one method of carrying the same into effect, I have diagrammatically illustrated in the drawing, the portions of the rake in a different form than which has been conventional to the time of this device. The device includes an elongated cylindrical handle 4, having a slight knob 5 on one end and its opposed end being formed as a flat rectangular portion 7 as illustrated in FIGURE 5. Two small holes 6 are drilled through the handle intermediate its ends. Near the end of the handle a hole 8 is drilled which allows the rake to be hung for storage. Attached to both sides of the rectangular base of the handle and perpendicular to the handle, are braces 9 with extensions at their top and bottom portions. To these braces 9, braces 11 are pivoted by means of a long pin 10 running through braces 11 and through braces 9. Braces 11 are affixed to part of the blades 12. These blades 12, one left, one right of handle are in open position as in FIGURE 1 when in use or in closed position as in FIGURE 6 when not in use.

At the outer end of each blade are braces 20 with small extensions at their top and bottom ends and drilled with a small hole, through which wires 14 of very strong tensile strength will run from point 6 in the handle. These wires have a right angle bend at 6 so as to enter the handle at this point and hold the blades in open position. When these wires are pulled out of the holes at 6 the blades are allowed to fold against the handle for storage. This is illustrated at 19 in FIGURE 5 and the folded position is illustrated in FIGURE 6.

On the back of each blade are braces 13 attached to braces 20 in front of blades by rivets through the blades. These braces 13 on the back are slightly curved at their top and bottom ends, so as to form runners keeping the blades level with ground. The extensions of the braces 9 at their top ends include elongated holes 15 as illustrated in FIGURE 7 which will allow blades 12 to move up and down illustrated at 16 in FIGURE 2 thus allowing the blades to ride level to ground.

The top of blades 12 have a serrated edge 17 for gathering tight clinging leaves and an opposed or bottom straight edge 18 for gathering loose leaves.

Having fully described my invention, what I claim as new and desire to secure by Letters Patent is:

1. A foldable rake comprising an elongated handle having a flat rectangular portion at one end thereof, a pair of substantially U shaped brace members, each brace member having a substantially vertically extending bight portion and upper and lower leg portions extending substantially perpendicularly to said bight portion, each of said pair of brace members being disposed on an opposed side of said rectangular portion, the bight portions of said brace members being fixed to said rectangular portion and to each other, the upper and lower leg portions of each brace member thereby extending in opposite directions respectively; an elongated pivot pin extending between the upper and lower leg portions of each of said brace members, said leg portions being apertured to loosely mount said pins; a pair of substantially rectangular rake-members each including inner and outer end portions, each rake member being pivotally connected to one of said brace members at its inner portion by means of its respective pivot pin; and manually operable means connected between said handle and the outer portion of each rake member, said means including first and second substantially vertically opposed extensions fixed to said rake members at their outer end portions, said extensions having vertically opposed apertures; and individual connection means associated with each rake member, each of said connecting means having a first portion removably attached to said handle, an intermediate portion extending through said opposed apertures and an end portion affixed to said first portion, said connecting means being operative to pivot said rake members about said brace members from an open extended position to a closed position adjacent said handle.

2. The device of claim 1 wherein said handle includes a pair of apertures intermediate its ends, said first portion of each of said connecting means including an extension portion selectively slideably received in said apertures to removeably connect said connecting means to said handle.

3. The device of claim 1 wherein said connecting means comprises high tensile strength wire; said rectangular rake members including upper and lower edges extending from said inner and outer end portions, said lower edge being substantially straight and said upper edge being serrated; and said rake members being curved between said upper and lower edges.

4. The device of claim 3 wherein the side of each of said rake members adjacent said handle when the rake is in the closed position constitutes a back side and the opposed side constitutes a front side; vertically extending brace members fixed to the inner and outer end portions of each of said rake members on the front side thereof, said brace members including curved end portions extending beyond said upper and lower edges and extending away from said front side, said curved ends forming ground engaging runners to maintain the edges of the blade above the ground.

References Cited

UNITED STATES PATENTS

| | | | |
|---|---|---|---|
| 90,691 | 1/1869 | Senour | 56—400.19 |
| 293,210 | 2/1884 | Dennen et al. | 56—400.19 |
| 820,601 | 5/1906 | Robinson | 172—373 |
| 1,318,079 | 10/1919 | Hoag | 56—400.05 |
| 2,086,170 | 7/1937 | Muranaka | 56—400.19 X |
| 2,902,815 | 9/1959 | Gallo | 56—400.19 |

ANTONIO F. GUIDA, Primary Examiner

PASQUALE A. RAZZANO, Assistant Examiner

U.S. Cl. X.R.

172—373